June 10, 1952  J. B. GOTTFRIED  2,599,757
ION EXCHANGE SYSTEM
Filed Aug. 10, 1949
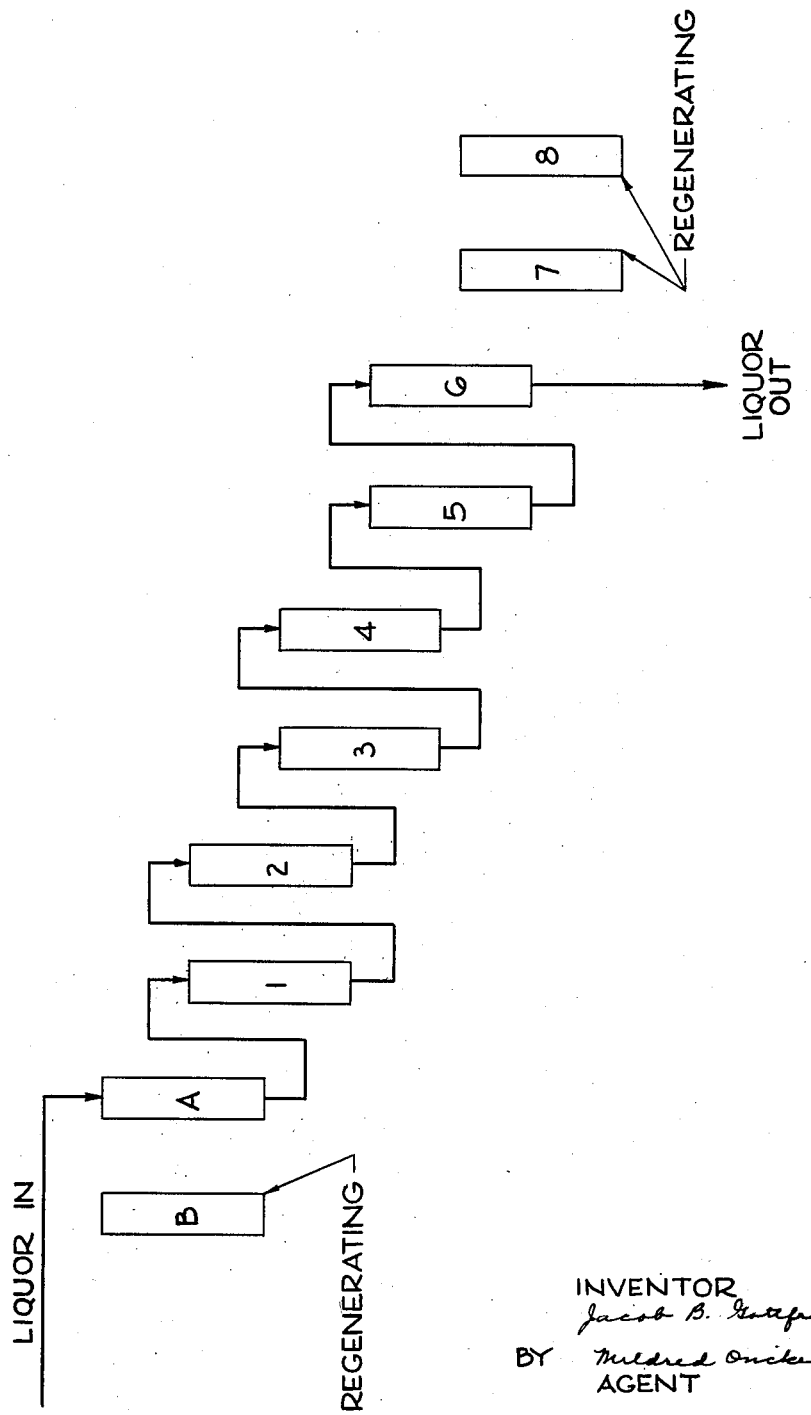
INVENTOR
Jacob B. Gottfried
BY Mildred Oncken
AGENT Patented June 10, 1952

2,599,757

UNITED STATES PATENT OFFICE 2,599,757

ION EXCHANGE SYSTEM

Jacob B. Gottfried, Chicago, Ill., assignor to Corn Products Refining Company, New York, N. Y., a corporation of New Jersey Application August 10, 1949, Serial No. 109,531

21 Claims. (Cl. 127—46)

This invention relates to the treatment of sugar liquors, and more particularly dextrose-containing liquors, with ion exchange materials.

A number of cation exchange materials of different types are available for deashing and refining aqueous solutions such as sugar liquors. These materials range in properties from those having a high refining capacity for aqueous solutions such as sugar liquors and low deashing capacity to those having a high deashing capacity but only slight refining capacity. By "refining capacity," as used herein, is meant the ability of an ion exchanger to remove organic and other impurities present in sugar liquors, e. g., color bodies and materials such as hydroxymethylfurfural giving rise to color bodies; colloidal material; etc. Obviously, a cation exchanger having both a high deashing and high refining capacity would be most economical and efficient for the treatment of sugar liquors. However, all of these desirable properties are not possessed by any single cation exchanger available. It has been necessary, therefore, to accept some compromise between quality of sugar liquor effluent from the system and economical operation.

Other difficulties are encountered in ion exchange treatment of sugar liquors, particularly when employing a multiple pass system. The term "multiple pass system" as used herein refers to a system, usually countercurrent, wherein the sugar liquor being treated is passed through several pairs of cation and anion exchangers in series.

If an anion exchanger occupies first position in the system, there is danger that it will lose capacity to remove acid due to adsorption of metallic cations, such as copper and iron, and organic and other suspended impurities. While it is desirable to remove as much non-sugar substances as completely as possible, adsorption of these by the anion exchanger impairs its capacity to such an extent that unduly frequent changes of anion exchange material are required. This defeats economical operation of the process, since anion exchange materials are considerably more expensive than cation exchange materials.

On the other hand, if a cation exchanger column occupies first position when an acidic liquor such as starch hydrolyzate is being passed through, there is difficulty due to "pseudo-regeneration," i. e., the acidic liquor will actually pick up ash from the cation exchanger because in the usual countercurrent multiple pass system the first position columns are nearly exhausted. Thus, the ash which the first position bed would be expected to remove is shifted to the second position and a further additional load is placed on the second position cation exchanger due to the ash picked up by the liquor. The effective capacity of the system is thereby reduced.

Accordingly, it is an object of this invention to provide a method of obtaining refined sugar liquors of improved quality and greater uniformity by an improved method of operation which eliminates or greatly reduces the foregoing difficulties.

It is also an object of this invention to provide a more efficient and economical process for the purification of sugar liquors.

It is a further object to provide a method of producing ion exchange treated sugar liquor of uniform quality.

Another object is to provide an improved method of purifying acidic dextrose-containing liquors, e. g., starch hydrolyzate, wherein ion exchange resins are used to remove the acidity.

Other objects and advantages will appear hereinafter.

According to this invention, the sugar-containing liquor to be purified is first treated with a cation exchanger of relatively high deashing capacity, then with an anion exchange material, if desired, followed by a cation exchange material of relatively high refining capacity.

The primary function of the first cation exchange material is the removal of ash, while the primary function of the other cation exchange material is that of refining. However, to obtain the advantages of the new system of ion exchange treatment according to this invention, it is not necessary that each of these cation exchange materials perform exclusively their primary functions; i. e., a given material for use in the first cation exchange treatment may possess a certain degree of refining capacity, or the second cation exchange material may have some deashing capacity, but this overlapping of functions would be a secondary consideration. The fundamental consideration is that the first cation exchange material (deashing step) have a higher deashing capacity relative to the other, and that this latter cation exchange material (refining step) have a higher refining capacity relative to the former, i. e., ash is largely, if not completely, removed by the former and the greatest percentage of color, etc. is removed by the latter.

A sulfonated polystyrene type of cation exchanger such as that sold by Dow Chemical Company under the trade-mark "Dowex 50," by National Aluminate Company under the trade-mark "Nalcite HCR," and by Rohm and Haas Company under the trade-mark "Amerlite IR-120" is one type of cation exchange material suitable for use in the deashing step. A sulfonated coal type of cation exchanger such as sold by the Permutit Company under the trade mark "Zeo-Karb H" is an example of a material suitable for use in the refining step. The sulfonated polystyrene cation enchanger has a total capacity of approximately 8.8 lbs. of ash per cu. ft. of resin and the sulfonated coal approximately 2.8 lbs. of ash per cu. ft. of resin, when treating neutralized sugar liquor giving a ratio of approximately 4 to 1 between deashing capacities. If highly acidic liquor is being treated, actual amount of ash removed by each material will be less, but the ratio will be about the same, i. e., the deashing capacity of the first cation exchange material will be four times as great as that of the other cation exchange material used in the system.

On the other hand, the refining capacity of the second material is considerably greater than that of the material used in the deashing step, as can be seen from Tables I and II below. These tables present a comparison of the refining capacities of a sulfonated coal type of cation exchanger and a sulfonated polystyrene type. The figures in both tables were obtained on single column treatment of the same neutralized dextrose-containing liquor. In Table I, the volume of liquor treated was that required to exhaust each material in terms of ash removal. Table II presents a comparison of the refining performance of both cation exchange materials at the same liquor through-put. As can be seen by comparison with Table I, the volume of liquor treated was greatly in excess of that representing the deashing capacity of the "Zeo-Karb H" and much less than the deashing capacity of the "Dowex 50," which means that the operating conditions were more favorable to the performance of the "Dowex 50."

TABLE I

|  | "Zeo-Karb H" | "Dowex 50" |
| --- | --- | --- |
| Volume of liquor treated...gal./cu. ft.. | 68 | 243 |
| Color removed............per cent.. | 44.2 | 13.4 |
| Nitrogen removed............do.... | 65.7 | 21.7 |
| Hydroxymethylfurfural removed per cent.. | 58.8 | 4.8 |

TABLE II

|  | "Zeo-Karb H" | "Dowex 50" |
| --- | --- | --- |
| Volume of liquor treated...gal./cu. ft.. | 158 | 158 |
| Color removed............per cent.. | 28.8 | 12.1 |
| Nitrogen removed............do.... | 51.2 | 22.0 |
| Hydroxymethylfurfural removed per cent.. | 42.9 | 9.5 |

The above tables are given merely to illustrate one possible combination of cation exchange materials for use in practicing this invention, and the principle on which the selection of a suitable combination is based.

Sulfonated phenol-formaldehyde cation exchange materials are another type of material suitable for use as the deashing material. The deashing capacity of these resins is generally somewhat less than that of the sulfonated polystyrene cation exchangers. The deashing capacity of the sulfonated phenol-formaldehyde exchangers is about twice that of the sulfonated coal exchanger used above; i. e., the ratio in this case would be 2:1.

Other types of cation exchange materials than the above-mentioned deashing and refining materials may be used. Any two materials which have the same qualitative relationship, i. e., one having a high deashing capacity relative to the other and one having a high refining capacity, relative to the first, provide a combination suitable for use in practicing this invention.

Referring now to the annexed drawing, this is a flow chart illustrating the application of the invention in a triple pass countercurrent system.

Columns A and B contain a cation exchanger with a high deashing capacity relative to the other cation exchange material to be used in the system; columns 1, 3, 5, and 7, an anion exchange material; and columns 2, 4, 6, and 8 a cation exchange material with a higher refining capacity than the first cation exchange material.

Of the ten cells comprising this system seven are in service at any given time while the other three are being regenerated. With the exception of columns A and B, the system is operated countercurrently, the freshly regenerated pair of columns being in the last position.

Columns A, 1, 2, 3, 4, 5, and 6 are in service while columns B, 7, and 8 are out for regeneration. When column 1 (anion) is exhausted, it is removed for regeneration along with the companion cation exchange column (2). Columns 3 and 4 are then placed in the position formerly occupied by 1 and 2; 5 and 6 are placed in the position formerly occupied by 3 and 4, and a freshly regenerated pair (7 and 8) is moved into the position formerly occupied by 5 and 6. Control of the system is exercised by checking the pH value of the liquor leaving the leading anion exchange column. When this value drops into the range of 3.8 to 4.0, the column is considered exhausted and is removed for regeneration along with its companion cation exchange column.

The columns A and B may be of the same size as the other columns or of any convenient size, and change-over between the two made whenever necessary. However, a given size column of high deashing cation exchange material is usually capable of treating a larger amount of sugar liquor before requiring regeneration than a column of equal size of high refining cation exchanger. For example, if a sulfonated polystyrene type of cation exchanger is used in columns A and B; and a sulfonated coal type of cation exchanger is used in columns 2, 4, 6, and 8, the capacity with respect to treating sugar liquor of the high deashing columns A and B will be about four times that of the high refining cation columns 2, 4, 6, and 8, as explained above. Thus, if the columns containing the two different types of cation exchange materials are of the same size, column A or B will require regeneration only once every complete cycle, i. e., for every four regenerations of the other columns. If desired, columns A and B could be only one-fourth the size of the others so as to put them on the same regeneration cycle.

If other types of cation exchange materials are used in either the high refining or high deashing columns, or both, the ratio between the capacities of the two materials would differ, and if it were desired to have them both on the same regeneration cycle or to correlate the regeneration cycles of the columns of different resins in some definite way, this new ratio would have to be used as the basis.

Columns 1, 3, 5, and 7 are filled with any suitable anion exchange material, e. g., a synthetic polyamine type of resin such as sold by Chemical Process Company under the trademarks "Duolite A-3" and "Duolite A-6," by American Cyanamid Company under the trademark "Ionac A-300," by the Permutit Company under the trade-mark "Deacidite," and by Rohm and Haas Company under the trade-mark "Amberlite IR-4B."

The following example illustrates one manner of carrying the invention into effect using the particular embodiment of the invention shown in the annexed drawing:

*Example*

An improved countercurrent multiple pass ion exchange system as described above was operated for 16 complete cycles (64 regenerations) over an extended period. The resin beds were subjected to more severe operating conditions than would be the case in normal plant operation. For example, the system was operated during the daytime only and was shut down on nights and weekends without "sweetening off." The term "sweetening off" is used herein to mean the process of rinsing the ion exchange materials free of sugar liquor. The system was operated intermittently. Such quiescent contact of the resin with the liquor is believed to be harmful. However, despite this intermittent operation excellent results were obtained, as can be seen by examination of the data in the attached tables.

Referring now to the accompanying flow chart, columns A and B were filled with "Dowex 50" cation exchange resin; columns 1, 3, 5, and 7 with "Duolite A-3" anion exchange material; and columns 2, 4, 6, and 8 with "Zeo-Karb H" cation exchanger. Each column contained 0.00352 cubic foot of resin.

The "Dowex 50" columns were regenerated with 45 gal. of 5% sulfuric acid per cu. ft. of resin, while the "Zeo-Karb H" columns were regenerated with 26.2 gal. of 5% sulfuric acid per cu. ft. of resin. The anion exchanger beds were regenerated with 9.4 gal. of 4% ammonia per cu. ft. of resin. Distilled water or equivalent such as condensate was used for all backwashing and rinsing operations, and all runs were made at room temperature. Bentonite clarified dextrose solution obtained by the conventional acid hydrolysis of starch was used in cycles 1 to 12. Mixtures of starch hydrolysate and reconverted greens from crystallization of dextrose, similarly treated with bentonite, were used in cycles 13 to 16.

Table III gives a summary of operation of the system for 16 complete cycles, while Table IV shows analytical values of feed liquors and effluents. The 40-day shutdown after the fifth cycle is reflected in the capacity drop for the sixth cycle (column 4, Table III), but on the following cycle the capacity was back to normal. A similar drop occurred on the thirteenth cycle, after the two-month shutdown, but the capacity was rising gradually at the sixteenth cycle.

Table III shows that the system effects an essentially constant percentage color removal, and relatively constant removal of other organic impurities such as nitrogen and hydroxymethylfurfural.

TABLE III

*Summary of operation of improved multipass ion exchange system*

| Cycle | Ash Removed— | | Per Regeneration per Cu. Ft. of Duolite A-3 and Zeo-Karb H | | | | | |
|---|---|---|---|---|---|---|---|---|
| | Lb. per cu. ft. of Dowex-50 | Per Cent | Gal. 0.03N Acid Liquor Treated | HMF Removed [1] | | Nitrogen Removed— | | Color Removed, Per Cent |
| | | | | Lb. | Per Cent | Lb. | Per Cent | |
| 1 | 4.28 | 90.4 | 235 | 1.75 | 85.9 | 0.060 | 82.7 | 98.5 |
| 2 | 4.28 | 91.3 | 223 | 0.64 | 42.3 | 0.054 | 84.3 | 94.8 |
| 3 | 3.18 | 87.6 | 200 | 0.63 | 48.0 | 0.044 | 93.6 | 95.8 |
| 4 | 4.07 | 91.7 | 223 | 0.35 | 33.1 | 0.057 | 88.0 | 94.8 |
| 5 | 2.84 | 88.8 | 228 | 1.17 | 52.9 | 0.040 | 80.0 | 92.3 |
| 6 | 1.81 | 90.5 | 171 | 0.78 | 60.1 | 0.062 | 91.8 | 96.8 |
| 7 | 0.87 | 56.0 | 215 | 0.71 | 60.8 | 0.030 | 91.0 | 96.5 |
| 8 | 2.18 | 83.2 | 250 | 0.72 | 49.4 | 0.069 | 100 | 97.8 |
| 9 | 1.20 | 78.0 | 212 | 0.55 | 46.4 | 0.049 | 76.1 | 98.4 |
| 10 | 1.18 | 92.3 | 202 | 0.53 | 50.1 | 0.043 | 92.5 | 98.8 |
| 11 | 1.43 | 87.2 | 210 | 0.42 | 42.9 | 0.033 | 86.8 | 98.5 |
| 12 | 2.32 | 95.8 | 209 | 0.61 | 49.2 | 0.048 | 100 | 98.7 |
| 13 | 1.55 | 82.4 | 136 | 2.08 | 72.1 | 0.044 | 75.2 | 99.1 |
| 14 | 2.13 | 88.2 | 134 | 1.20 | 57.8 | 0.026 | 62.8 | 98.6 |
| 15 | 1.63 | 86.5 | 156 | 0.72 | 45.0 | 0.036 | 85.1 | 99.0 |
| 16 | 2.21 | 89.5 | 175 | 0.41 | 35.7 | 0.022 | 77.5 | 98.7 |

[1] Hydroxymethylfurfural.

TABLE IV

*Summary of analyses of influents and effluents from improved multipass ion exchange system.*

| Cycle | Effluent pH | Ash, Per Cent d. b.[1] | | HMF [2], Per Cent d. b. | | Nitrogen, Per Cent d. b. | | Color | |
|---|---|---|---|---|---|---|---|---|---|
| | | Inf.[3] | Eff.[4] | Inf. | Eff. | Inf. | Eff. | Inf. | Eff. |
| 1 | 4.5 | 0.276 | 0.025 | 0.48 | 0.07 | 0.017 | 0.002 | 13.7 | 0.2 |
| 2 | 4.5 | 0.349 | 0.03 | 0.45 | 0.21 | 0.019 | 0.003 | 5.2 | 0.3 |
| 3 | 4.5 | 0.299 | 0.03 | 0.42 | 0.18 | 0.015 | 0.001 | 8.9 | 0.4 |
| 4 | 4.4 | 0.294 | 0.03 | 0.42 | 0.24 | 0.015 | 0.002 | 8.9 | 0.6 |
| 5 | 4.6 | 0.30 | 0.027 | 0.66 | 0.32 | 0.015 | 0.003 | 8.8 | 0.7 |
| 6 | 4.6 | 0.193 | 0.018 | 9.50 | 0.21 | 0.026 | 0.002 | 20.3 | 0.6 |
| 7 | 4.7 | 0.13 | 0.06 | 0.39 | 0.16 | 0.011 | 0.001 | 11.8 | 0.4 |
| 8 | 4.6 | 0.17 | 0.03 | 0.38 | 0.20 | 0.018 | 0.000 | 30.7 | 0.65 |
| 9 | 4.5 | 0.13 | 0.03 | 0.40 | 0.22 | 0.022 | 0.005 | 45.5 | 0.7 |
| 10 | 4.5 | 0.14 | 0.012 | 0.46 | 0.23 | 0.021 | 0.002 | 37.0 | 0.43 |
| 11 | 4.6 | 0.16 | 0.020 | 0.385 | 0.22 | 0.015 | 0.002 | 31.0 | 0.45 |
| 12 | 4.6 | 0.24 | 0.01 | 0.49 | 0.25 | 0.019 | 0.000 | 36.1 | 0.45 |
| 13 | 4.3 | 0.17 | 0.03 | 1.04 | 0.29 | 0.021 | 0.005 | 171.2 | 1.4 |
| 14 | 4.4 | 0.26 | 0.03 | 0.90 | 0.38 | 0.018 | 0.007 | 107.2 | 1.5 |
| 15 | 4.3 | 0.21 | 0.03 | 0.78 | 0.46 | 0.019 | 0.003 | 150.9 | 1.7 |
| 16 | 4.4 | 0.37 | 0.04 | 0.69 | 0.46 | 0.017 | 0.004 | 96.0 | 1.3 |

[1] Dry basis.
[2] Hydroxymethylfurfural.
[3] Influent.
[4] Effluent.

The ash removed by the system (shown in column 2, Table III) is not the capacity figure for each cycle. The amount of ash removed in each case was dependent on the ash content of the feed liquor and on the capacity of the anion exchange resin. This capacity was the limiting factor which determined the amount of liquor put through the system in each cycle, and this volume of liquor was generally insufficient to exhaust the cation exchange bed. The ash in the effluent remained uniformly constant at a low value (see column 4, Table IV).

Such uniformly high percentage color removal and uniform effluent pH obtained in this system has not been observed in other multiple pass systems. In the case of the conventional triple pass system the pH value of the effluent generally fluctuates over a wider range. The advantage of uniform results obtained in the improved system is self-evident.

The system described herein may also be used advantageously in the deashing and refining of neutralized liquor. The problem of "pseudo-regeneration" is not present in ion exchange treatment of these liquors, but the other advantages gained from utilization of the properties of two different types of cation exchange materials may be fully realized.

These other advantages, e. g. improved quality of ion-exchange treated sugar liquor, are likewise realized by utilization of a high deashing capacity cation exchange resin and a high refining capacity cation exchange resin in a single pass system, wherein the problem of "pseudo-regeneration" similarly is not encountered. Single pass systems are generally used in treatment of sucrose-containing liquors in order to reduce to a minimum the danger of inversion. However, the system may also be used in the treatment of other sugar-containing liquors, such as dextrose liquors.

The improved system described herein may also be operated as a double pass system with satisfactory results, although the triple pass system is preferred.

I claim:

1. A process for the treatment of sugar-containing liquids, comprising contacting said liquid first with a cation exchange material having high deashing capacity, operating in the hydrogen cycle, to remove ash; and then with a cation exchange material having higher refining capacity and lower deashing capacity than said first-mentioned cation exchange material, operating in the hydrogen cycle; whereby said liquid is freed from organic and other impurities.

2. A process for the treatment of sugar-containing liquids, comprising contacting said liquid first with a cation exchange material having high deashing capacity, operating in the hydrogen cycle, to remove ash; then with an anion exchange material, operating in the acid removal cycle; and a cation exchange material having higher refining capacity and lower deashing capacity than said first-mentioned cation exchange material, operating in the hydrogen cycle; whereby said liquid is freed from organic and other impurities.

3. A process for the treatment of sugar-containing liquids, comprising contacting said liquid with a sulfonated type cation exchange resin having high deashing capacity, operating in the hydrogen cycle, to remove ash; an anion exchange material, operating in the acid removal cycle; and a sulfonated carbonaceous cation exchange material, operating in the hydrogen cycle; whereby said liquid is freed from organic and other impurities.

4. A process for the treatment of sugar-containing liquids, comprising contacting said liquid with a sulfonated polystyrene cation exchange resin, operating in the hydrogen cycle, to remove ash; an anion exchange material, operating in the acid removal cycle; and a sulfonated carbonaceous cation exchange material, operating in the hydrogen cycle; whereby said liquid is freed from organic and other impurities.

5. A process for the treatment of sugar-containing liquids, comprising contacting said liquid with a sulfonated polystyrene cation exchange resin, operating in the hydrogen cycle, to remove ash; an anion exchange material, operating in the acid removal cycle; and a sulfonated coal cation exchange material, operating in the hydrogen cycle; whereby said liquid is freed from organic and other impurities.

6. A process for the treatment of sugar-containing liquids, comprising contacting said liquid with a sulfonated synthetic cation exchange resin, operating in the hydrogen cycle to remove ash; an anion exchange resin of the amine type, operating in the acid removal cycle; and a sulfonated carbonaceous cation exchange material, operating in the hydrogen cycle; whereby said liquid is freed from organic and other impurities.

7. A process for the treatment of acidic sugar-containing liquids, comprising contacting said liquid with a sulfonated synthetic cation exchange resin, operating in the hydrogen cycle, to remove ash; an anion exchange material, operating in the acid removal cycle; and a sulfonated carbonaceous cation exchange material, operating in the hydrogen cycle; whereby said liquid is freed from organic and other impurities.

8. A process for the treatment of sugar-containing liquids, comprising contacting said liquid with a sulfonated synthetic cation exchange resin, operating in the hydrogen cycle, to remove ash; and at least one pair of ion exchangers including an anion exchange material, operating in the acid removal cycle, and a sulfonated carbonaceous cation exchange material, operating in the hydrogen cycle; whereby said liquid is freed from organic and other impurities.

9. A process for the treatment of sugar-containing liquids, comprising contacting said liquid with a sulfonated synthetic cation exchange resin, operating in the hydrogen cycle, to remove ash; and a plurality of pairs of ion exchangers including an anion exchange material, operating in the acid removal cycle, and a sulfonated carbonaceous cation exchange material, operating in the hydrogen cycle; whereby said liquid is freed from organic and other impurities.

10. A process for the treatment of sugar-containing liquids, comprising contacting said liquid with a sulfonated polystyrene cation exchange resin, operating in the hydrogen cycle, to remove ash; and a plurality of pairs of ion exchangers, each of said pairs including an anion exchange material, operating in the acid removal cycle, and a sulfonated carbonaceous cation exchange material, operating in the hydrogen cycle; whereby said liquid is freed from organic and other impurities.

11. A process for the treatment of sugar-containing liquids, comprising contacting said liquid with a sulfonated polystyrene cation exchange resin, operating in the hydrogen cycle, to remove ash; and at least one pair of ion exchangers including an anion exchange material, operating in the acid removal cycle, and a sulfonated coal cation exchange material, operating in the hydrogen cycle; whereby said liquid is freed from organic and other impurities.

12. A process for the treatment of sugar-containing liquids, comprising contacting said liquid first with a cation exchange material having high deashing capacity, operating in the hydrogen cycle, to remove ash; and then with at least one pair of ion exchangers including an anion exchange material, operating in the acid removal cycle, and a cation exchange material having higher refining capacity and lower deashing capacity than said first-mentioned cation exchange material, operating in the hydrogen cycle, whereby said liquid is freed from organic and other impurities.

13. A process for the treatment of dextrose-containing liquids, which comprises contacting said liquid with a sulfonated type cation exchange resin having high deashing capacity, operating in the hydrogen cycle, to remove ash; an anion exchange material, operating in the acid removal cycle; and a sulfonated carbonaceous cation exchange material, operating in the hydrogen cycle; whereby said liquid is freed from organic and other impurities.

14. A process for the treatment of dextrose-containing liquids, which comprises contacting said liquid with a sulfonated polystyrene cation exchange resin, operating in hydrogen cycle, to remove ash; an anion exchange material, operating in the acid removal cycle; and a sulfonated carbonaceous cation exchange material, operating in the hydrogen cycle; whereby said liquid is freed from organic and other impurities.

15. A process for the treatment of dextrose-containing liquids, which comprises contacting said liquid with a sulfonated polystyrene cation exchange resin, operating in the hydrogen cycle, to remove ash; an anion exchange material, operating in the acid removal cycle; and a sulfonated coal cation exchange material, operating in the hydrogen cycle; whereby said liquid is freed from organic and other impurities.

16. A process for the treatment of dextrose-containing liquids, which comprises contacting said liquid with a sulfonated polystyrene cation exchange resin, operating in the hydrogen cycle, to remove ash; a synthetic polyamine anion exchange resin, operating in the acid removal cycle; and a sulfonated coal cation exchange material, operating in the hydrogen cycle; whereby said liquid is freed from organic and other impurities.

17. A process for the treatment of dextrose-containing liquids, which comprises contacting said liquid with a sulfonated synthetic cation exchange resin, operating in the hydrogen cycle, to remove ash; and at least one pair of ion exchangers including an anion exchange material, operating in the acid removal cycle, and a sulfonated carbonaceous cation exchange material, operating in the hydrogen cycle; whereby said liquid is freed from organic and other impurities.

18. A process for the treatment of dextrose-containing liquids, which comprises contacting said liquid with a sulfonated polystyrene cation exchange resin, operating in a hydrogen cycle, to remove ash; and at least one pair of ion exchangers including an anion exchange material, operating in the acid removal cycle, and a sulfonated coal cation exchange material, operating in the hydrogen cycle; whereby said liquid is freed from organic and other impurities.

19. A process for the treatment of dextrose-containing liquids, which comprises contacting said liquid with a sulfonated synthetic cation exchange resin, operating in the hydrogen cycle, to remove ash; then with a plurality of pairs of ion exchangers, the first member of each pair to contact said liquid being an anion exchange material, operating in the acid removal cycle, and the second member of each of said pairs being a sulfonated carbonaceous cation exchange material, operating in the hydrogen cycle; whereby said liquid is freed from colloidal materials, color bodies and materials giving rise to colr bodies, and other impurities.

20. A process for the treatment of acidic dextrose-containing liquids, which comprises contacting said liquid with a sulfonated polystyrene cation exchange resin, operating in the hydrogen cycle, to remove ash; then with a plurality of pairs of ion exchangers, the first member of said pairs to contact said liquid being a synthetic polyamine anion exchange resin, operating in the acid removal cycle, and the other member of each of said pairs being a sulfonated coal cation exchange material, operating in the hydrogen cycle; whereby said liquid is freed from colloidal materials, color bodies and materials giving rise to color bodies, and other impurities.

21. A process for the treatment of sugar-containing liquids, which comprises contacting said liquid first with a cation exchange material, operating in the hydrogen cycle, and having relatively high deashing capacity and relatively low refining capacity, to remove ash; then with an anion exchange material, operating in the acid removal cycle; and a cation exchange material, operating in the hydrogen cycle, and having higher refining capacity and lower deashing capacity than said first-mentioned cation exchange material; whereby said liquid is freed from organic and other impurities.

JACOB B. GOTTFRIED.

REFERENCES CITED

The following references are of record in the file of this patent:

UNITED STATES PATENTS

| Number | Name | Date |
| --- | --- | --- |
| 2,372,233 | Thurston | Mar. 27, 1945 |
| 2,490,716 | Smith | Dec. 6, 1949 |

OTHER REFERENCES

Felton, Food Technology, February 1949, pages 40 to 42, 127-Ex. (page 41 pertinent).